(12) United States Patent
Dallan

(10) Patent No.: US 6,925,707 B1
(45) Date of Patent: Aug. 9, 2005

(54) ASSEMBLY MACHINE FOR THE AUTOMATIC PRODUCTION OF STRUCTURAL ELEMENTS FOR FALSE CEILINGS

(75) Inventor: Sergio Dallan, Castelfranco (IT)

(73) Assignee: Dallan S.r.l., Castelfranco Veneto (IT)

( * ) Notice: Subject to any disclaimer, the term of this patent is extended or adjusted under 35 U.S.C. 154(b) by 136 days.

(21) Appl. No.: 10/019,288

(22) PCT Filed: Jun. 27, 2000

(86) PCT No.: PCT/EP00/05970

§ 371 (c)(1),
(2), (4) Date: Jan. 4, 2002

(87) PCT Pub. No.: WO01/05534

PCT Pub. Date: Jan. 25, 2001

(30) Foreign Application Priority Data

Jul. 20, 1999 (IT) ........................................ VE99A0031

(51) Int. Cl.⁷ .............................................. B23P 19/00
(52) U.S. Cl. ............................ 29/795; 29/771; 29/783; 29/787; 29/897.3; 29/243.56; 29/33 K; 29/33 P; 29/650
(58) Field of Search ......................... 29/771, 783, 787, 29/795, 897, 897.3, 243.56, 33 K, 33 P, 33 Q, 650; 52/749.1, 749.12

(56) References Cited

U.S. PATENT DOCUMENTS

| | | | | |
|---|---|---|---|---|
| 2,902,139 A | * | 9/1959 | Brenk et al. | 198/774.1 |
| 3,133,981 A | * | 5/1964 | Seele | 264/261 |
| 3,150,440 A | * | 9/1964 | Jahn | 29/897.3 |
| 3,357,081 A | * | 12/1967 | Prestige | 29/897 |
| 3,546,772 A | * | 12/1970 | McConnell | 29/430 |
| 3,574,253 A | * | 4/1971 | Kay | 29/897.32 |
| 3,606,658 A | * | 9/1971 | McConnell | 29/897.3 |
| 3,613,204 A | * | 10/1971 | McConnell | 29/897.3 |
| 4,102,173 A | | 7/1978 | Saloom | |
| 4,442,577 A | | 4/1984 | Numano et al. | |
| 4,804,077 A | * | 2/1989 | John, Jr. | 198/339.1 |
| 5,082,227 A | * | 1/1992 | Insko | 248/343 |
| 5,477,596 A | * | 12/1995 | Schlosstein et al. | 29/33 K |
| 5,619,838 A | * | 4/1997 | Kasel | 53/139.7 |
| 6,134,775 A | * | 10/2000 | Castillo | 29/798 |
| 6,467,144 B1 | * | 10/2002 | Arrighi | 29/33 K |
| 6,497,034 B2 | * | 12/2002 | Chung | 29/509 |

FOREIGN PATENT DOCUMENTS

| | | | | |
|---|---|---|---|---|
| DE | 3443883 A1 | * | 6/1986 | 52/506.08 |
| EP | 0 292 716 | | 11/1988 | |
| FR | 2664633 A | * | 1/1992 | E04B/9/20 |
| FR | 2 671 571 | | 7/1992 | |

OTHER PUBLICATIONS

Japanese Patent Abstract, Publication No. 11207545, Published Aug. 3, 1999.

* cited by examiner

*Primary Examiner*—Essama Omgba
(74) *Attorney, Agent, or Firm*—Hoffman, Wasson & Gitler, PC

(57) ABSTRACT

An assembly machine forms structural elements for false ceilings. Structural elements are cut to size and sent to two series of lateral stations. A press forms inserts which are applied to the ends of the structural elements.

5 Claims, 2 Drawing Sheets

ASSEMBLY MACHINE FOR THE AUTOMATIC PRODUCTION OF STRUCTURAL ELEMENTS FOR FALSE CEILINGS

This invention relates to an assembly machine for the automatic production of structural elements for false ceilings.

BACKGROUND OF THE INVENTION

Structural elements for false ceilings are known, consisting of profile bars of inverted T-shape provided at their ends with hooks formed either directly from the central web of the T profile bar or from inserts which are formed separately for application to each profile during its production.

Said profile bars are connected together to form a lattice structure which by means of steel ties or cables is generally suspended at its top from the ceiling, their horizontal flanges lowerly supporting panels, staves and anything else required to form the false ceiling.

Such structural elements are currently formed using single-die presses, ie presses comprising a die of dimensions corresponding to the length of the profile bar to be formed, which is housed within the press and on which the various operations are carried out, possibly in a single step but more generally in several steps, and always within the actual die in which the bar is positioned. Said die is provided with a plurality of punches which are operated in sequence to effect on the bar such operations as perforating; drawing, crimping, etc.

These known single-die presses have however certain drawbacks, namely:
- poor flexibility in that for each size (length) of profile bar the press requires a particular die which has to be changed each time the profile bar is to be modified or following any change in dimensions or type of operation,
- they require a large number of different dies depending on the type of hook, the length of the profile bars and the type of operation to be carried out,
- they immobilize capital,
- they occupy considerable storage space.

BRIEF SUMMARY OF THE INVENTION

An object of the invention is to eliminate these drawbacks by providing an assembly machine in which profile bars of different dimensions and different hook types can be worked.

This object and further ones which result from the ensuing description are attained through an assembly machine.

BRIEF DESCRIPTION OF THE DRAWINGS

A preferred embodiment of the invention is described in detail hereinafter with reference to the accompanying drawings, on which.

DETAILED DESCRIPTION OF THE INVENTION

Figure 1:
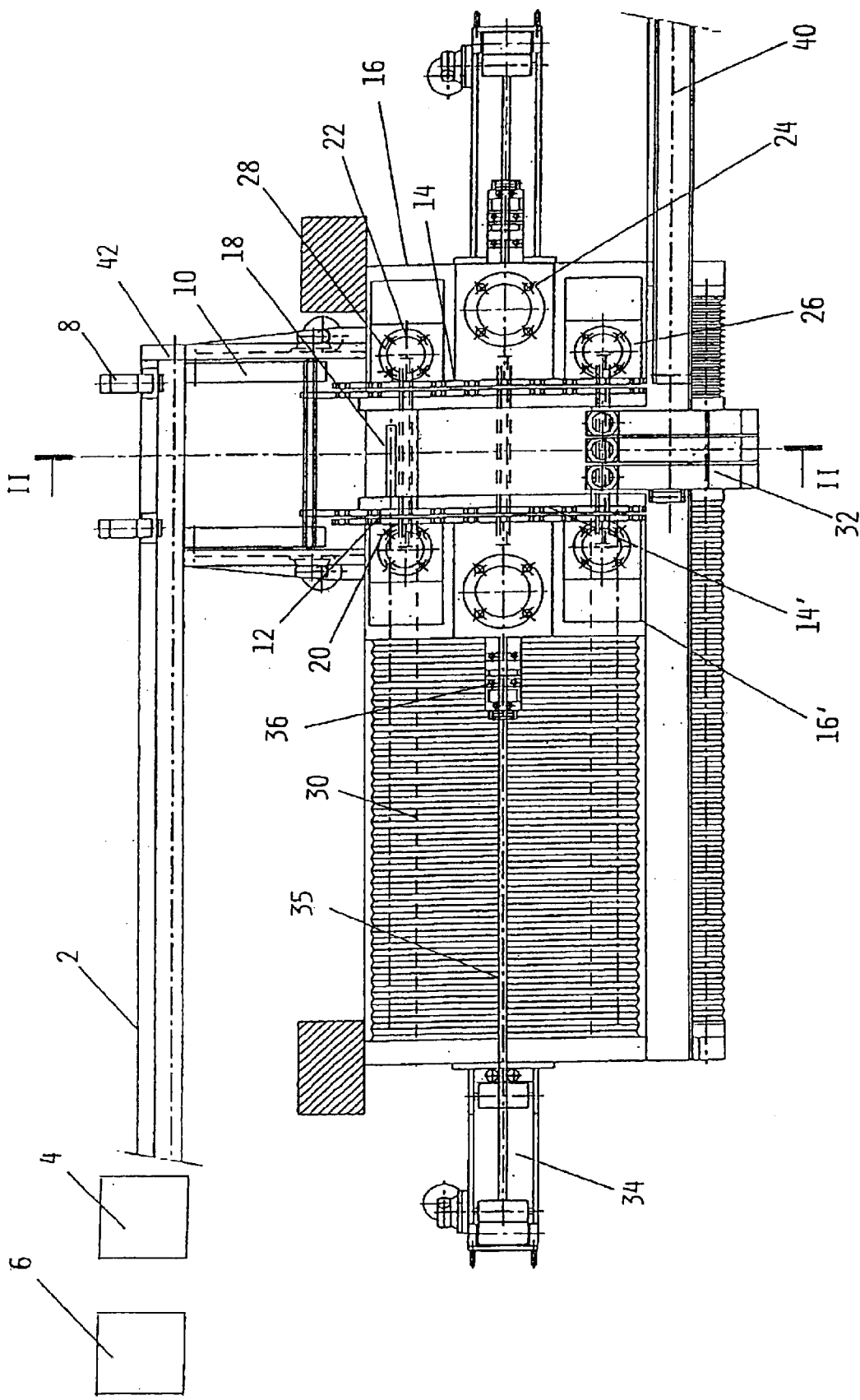
FIG. 1 is a plan view of the assembly machine of the invention.
Figure 2:
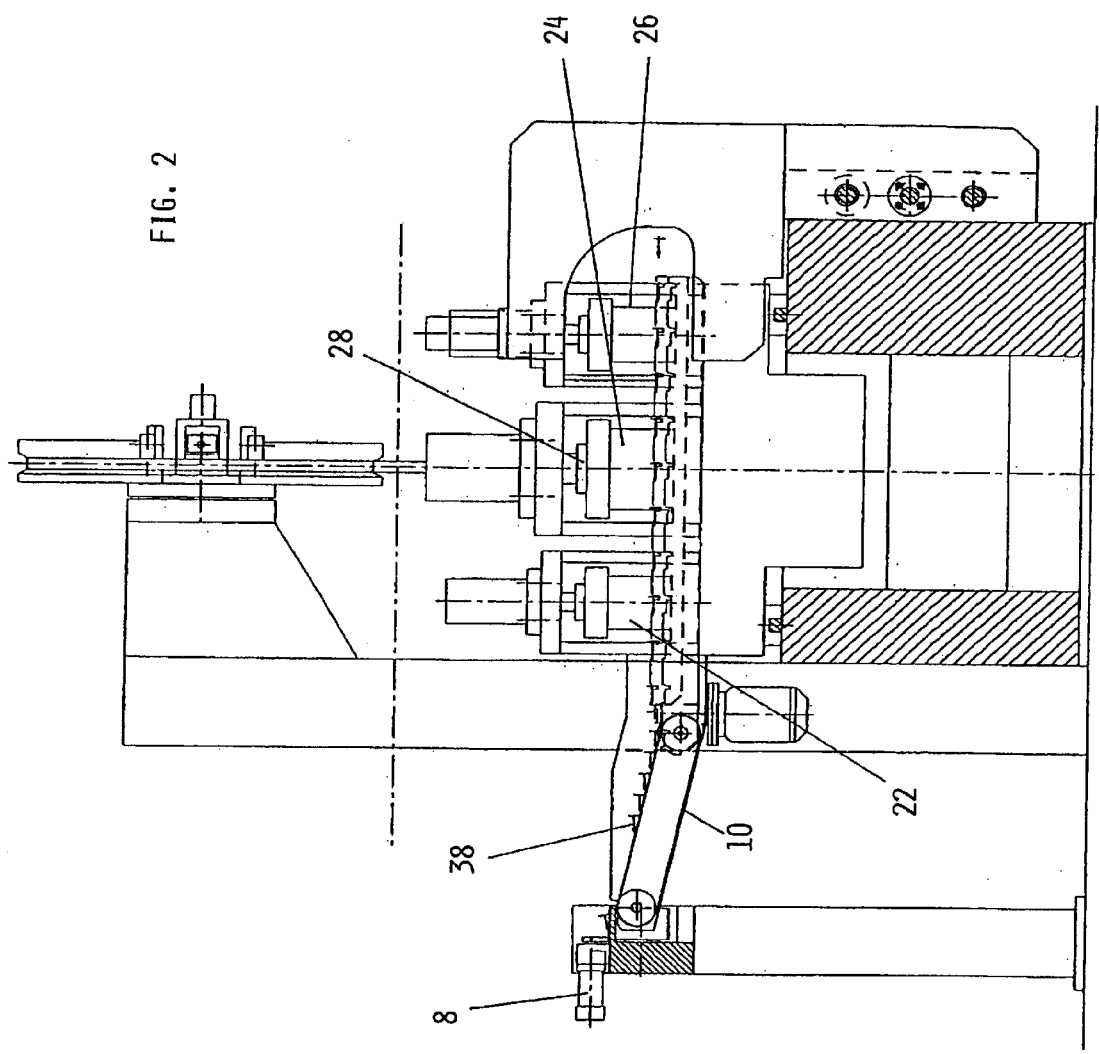
FIG. 2 is a cross-section there through on the line II-II of FIG. 1.

As can be seen from the figures, the assembly machine of the invention comprises a conveyor belt 2 provided downstream of a floating cutter 4 positioned at the exit of a forming machine 6.

At the downstream end of said conveyor belt there are provided two pushers 8 which move axially perpendicular to the axis of the belt 2.

Again at the downstream end of said belt there are provided two conveyor straps 10 which are inclined slightly downwards and feed a stepping device indicated overall by 12.

The stepping device comprises a pair of parallel chains 14, 14' mounted respectively on two shoulders 16, 16', one 16' of which is movable relative to the other shoulder 16 via a guide system 18 and manually operable recirculating ball sliders 20.

Three pairs of dies 22, 24, 26 are mounted on the shoulders 16, 16' and are each operated by a corresponding hydraulic cylinder 28.

With the shoulder 16' there is associated a bellows screen 30 able to cover the distance between the operating face of the dies and the left hand ends of the die bench following the movement of the shoulder 16'.

At the pair of dies 26, the machine of the invention also comprises movable transverse stations 32 positionable on the central part of the profile bar to be worked, and in particular on its vertical web.

A reel 34 about which steel strip 35 passes is provided to the side of the intermediate pair of dies.

The machine of the invention operates in the following manner: after adjusting the distance between the shoulders 16, 16' to adapt them to the length of the profile bars 38 to be worked, these profile bars, leaving the forming machine 6 already of T shape an cut by the floating cutter 4, are made to advance along the conveyor 2 until they encounter a limit switch 42, at which the pushers 8 transfer them onto the conveyor 10 such that they lie substantially on their side, ie with their web, vertical when installed, now lying horizontal because of the fact that the subsequent operations are performed mainly on this web.

The conveyor 10 transfers the profile bars stepwise to the device 12, which with its pair of chains 14, 14' grips each profile bar positioned transversely between the chains, raises it and advances it transversely between through a certain distance, to then lower it. The pitch of the stepping movement, ie the distance between two successive positions of each profile bar, is equal to the distance between the dies corresponding to the two working stations, and the rate of advancement of the stepping device is equal to the rate at which the pairs of dies of the two stations are operated.

At the pair of dies 24, inserts formed by,a press 36 acting on the strip 35 unwound from the reel 34 are applied to the ends of the profile bar.

Alternatively, the inserts are joined together to form a tape from which they are separated, to be applied to the ends of the bar portions.

In other cases in which it is not intended to apply such inserts, the pair of dies 24 punches the ends of the profile bars to form corresponding hooks.

When the profile bars arrive at the pairs of dies 26, the transverse stations 32 operate to form in the central region of the bar either holes for suspending it from the overlying ceiling, or apertures to be hooked by hooks provided on the other bars.

The positioning of these stations depends on the length of the bar to be worked and on the type of operation to be effected.

When these operations have been carried out the profile bars 38 are positioned on a conveyor belt 40 to be fed to discharge.

What is claimed is:

1. A machine for the automatic production of inverted T-shaped structural elements for false ceilings, comprising:

a stepping feeder for the T-shaped structural elements cut to size, two series of lateral stations interfering with ends of said structural elements fed transversely by said stepping feeder, and a plurality of dies provided in the different stations to subject the ends of said structural elements to a required operation, the position of a least one of the series of stations being adjustable relative to the other, such that at least one station is a station for applying inserts to the ends of said T-shaped structural elements, a press forming said inserts by acting on a strip unwound from a reel, said press being provided upstream of said station applying said inserts.

2. A machine as claimed in claim 1, wherein at least one of the series of stations is mounted on a shoulder which is adjustable relative to another shoulder supporting the other series of stations by a guide system and a manually operable recirculating ball slide.

3. A machine as claimed in claim 1, comprising a pair of transverse stations as the most downstream stations, said transverse stations being movable and positionable on the structural elements to effect operations on a central part of a vertical web of the structural elements.

4. A machine as claimed in claim 3, wherein said transverse stations are positionable in the length direction of the structural elements.

5. A machine as claimed in claim 1, wherein each die is operated by a hydraulic cylinder.

* * * * *